Patented Jan. 17, 1950

2,494,920

UNITED STATES PATENT OFFICE 2,494,920

METHOD OF COATING WITH ORGANOPOLYSILOXANES

Earl Leathen Warrick, Pittsburgh, Pa., assignor to Corning Glass Works, Corning, N. Y., a corporation of New York No Drawing. Application July 25, 1945, Serial No. 607,101

6 Claims. (Cl. 117—121)

This invention relates to coated articles and methods of making them. More particularly, it relates to organosilicon coating compositions, their manufacture and to methods of applying them as well as to the articles coated therewith.

The primary object of this invention is to provide a coating composition which, when properly applied to a given article, will yield a tack-free, non-porous, heat-resistant and water-impervious coating. It is also an object of this invention to provide a coating which is adapted to be used as an electrically insulating covering for metallic conductors and the like. A still further object is is provide a coating that is adapted to adhere tenaciously to textile fabrics such as cotton to form a water-impervious and water-repellent film thereon. Another object is to provide a coating which will adhere to siliceous materials such as porcelain, glass, and the like. Another object of the present invention is to provide a coating for metallic surfaces, siliceous articles, and so forth, which will withstand sudden, extreme, and repeated changes in temperature without separation from the treated surfaces. Other objects and advantages of the present invention will be apparent from the following description and claims.

In my copending application, Serial No. 557,056, filed October 3, 1944, now Patent No. 2,460,795, the preparation of heat resistant elastic molded products from organosiloxanes by reaction thereof with diacyl peroxides, is described. The process therein described involved the production of a moldable composition by treating an organosiloxane, with a minor proportion of a diacyl peroxide, at a temperature above the decomposition point of the peroxide until a high molecular weight material was obtained which had little or no flow at room temperature. This material was mixed with more peroxide and preferably but not necessarily milled with a heat-resistant filler such as a polyvalent metal oxide; placed in a mold and then curred at an elevated temperature to a tack-free condition. It was taught in said application that the moldable compositions should be molded or cured in the substantial absence of oxygen, particularly if in the form of thin films since it was found that oxygen interfered with the curing of the composition to a tack-free state.

I have now discovered a method of producing tack-free coatings of relatively thin dimensions which does not involve carrying out the curing in an atmosphere from which oxygen has been previously removed. This method comprises, generally, the steps of applying a film of the organosilicon composition to the article to be coated, said film having a thickness falling within certain narrow limits, raising the temperature of the film to at least 180° C. but not above 400° C. within a period of not more than 2 minutes, and thereafter holding the film within that temperature range until curing of the film is completed.

I have found that the above method completely obviates the necessity for taking precautions to exclude oxygen from the atmosphere in which the curing takes place. The films obtained are heat-resistant, oil resistant, electrically insulating, water-resistant, flexible and resilient. They are eminently adapted for use as coatings for metallic conductors, linings for tanks, and as protective coatings for siliceous as well as metallic surfaces.

The organosilicon compositions which are to be applied as films by the above process are prepared in the following manner. An organopolysiloxane is thoroughly mixed with a heat-resistant filler until a smooth, homogeneous, non-separating paste is obtained. The mixing is preferably carried out on a paint mill to insure complete homogeneity of the paste. A minor proportion of a diacyl peroxide is incorporated in the paste, either concurrently with the above mixing or thereafter as desired.

The organopolysiloxanes (commonly called "silicones"), which are used in preparing the above products, are compositions comprising essentially silicon atoms connected to each other by oxygen atoms through silicon-oxygen linkages, thus,

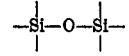

and having on the average 1.75 to 2.25 monovalent organic radicals attached through carbon-silicon linkages to each silicon atom. While they are preferably but not necessarily of high molecular weight, they should not have attained a degree of polymerization where they are no longer soluble in common hydrocargon solvents such as toluene. They must comprise the recurring structural unit which corresponds to the empirical formula RR'SiO where R and R' are alkyl radicals. Preferably, the number of units of this formula present in the siloxane is at least 60 per cent of the total number of silicon units in the siloxane. By silicon unit is meant any unit which corresponds to one of the following empirical formulae, $SiO_2$, $RSiO_{3/2}$, $R_2SiO$, and $R_2SiO_{1/2}$, where R is a monovalent organic radical attached to silicon through carbon-silicon linkages.

These organopolysiloxanes may be prepared by hydrolyzing a hydrolyzable dialkylsilane followed by condensation (partial or complete) of the hydrolysis product. They may also be prepared by hydrolyzing and condensing mixtures of different hydrolyzable organomonosilanes containing at least 60 mol per cent of a hydrolyzable dialkylsilane. In the latter case, hydrolyzable silanes which contain no organic radicals attached to silicon through carbon-silicon linkages, such as silicon tetrachloride or ethyl orthosilicate, may be included with the organosilanes, if desired. By employing such mixtures of silanes, in the proper proportions, it is possible to prepare organosiloxanes which contain on the average between 1.75 and 2.25 organic radicals per silicon atom. It is to be understood that the siloxanes may contain some uncondensed hydroxyl groups as well as some residual unhydrolyzed hydrolyzable radicals.

By hydrolyzable organosilanes, I mean derivatives of $SiH_4$, which have the general formula $R_y SiX_{(4-y)}$, where R represents an organic radical attached to silicon through carbon-silicon linkages; X represents a readily hydrolyzable radical selected from the class consisting of halogens, amino groups, alkoxy, aroxy and acyloxy radicals; and $y$ is an integer from 1 to 3. Examples of organic radicals represented by the symbol R are as follows: aliphatic radicals such as methyl, ethyl, propyl, isopropyl, butyl, amyl, hexyl, heptyl to octadecyl and higher; alicyclic radicals such as cyclopentyl, cyclohexyl, etc., aryl and alkaryl radicals such as phenyl, mono- and poly-alkyl phenyl as tolyl, xylyl, mesityl, mono-, di-, and tri-ethyl phenyls, mono-, di-, and tri-propyl phenyls, etc.; naphthyl, mono- and poly-alkyl naphthyls as methyl naphthyl, diethyl naphthyls, tri-propyl naphthyl, etc.; tetra-hydro-naphthyl, anthracyl, etc.; aralkyl such as benzyl, phenyl-ethyl, etc.; alkenyl such as methallyl, allyl, etc., and heterocyclic radicals. The above organic radicals may also, if desired, contain inorganic substituents such as halogens, etc.

As a filler for the paste, I prefer to use heat-resistant inorganic materials melting above 350° C., such as silicates, polyvalent metal oxides, etc. Among those which I have used are the following: asbestos, clay 188, silene (hydrated calcium silicate), zinc sulfide, silica aerogel, Buca clay, barium titanate, fiber glass flock, iron oxide, Wyoming bentonite, lithopone, zinc oxide, titania, magnesia, micronized graphite, micronized slate, micronized mica, celite, $PbO_2$, PbO, blue lead, dehydrated alumina and hydrated alumina. The particular filler selected depends considerably upon the specific property, or properties desired. If strength, toughness and high stretch are desired, zinc oxide, titanium oxide and hydrated aluminum oxide are the best. If small weight loss and slight dimensional change after long exposure to elevated temperatures are required, asbestos is an excellent filler. When fast setting time is desired, iron oxide is the best filler.

In general, I have found any diacyl peroxide containing at least one aromatic acyl radical to be effective in my process. Examples of such peroxides are benzoyl peroxide, benzoyl acetyl peroxide, dinaphthoyl peroxide, benzoyl lauroyl peroxide, etc. The acyl radical may contain inorganic substituents such as halogens, nitro groups, etc.

The relative proportions of organosiloxane, filler and peroxide can be varied quite widely with the only general limitations being that the mixture of organosiloxanes and filler must have substantially the consistency of paste and must contain sufficient peroxide to promote curing of the siloxane to a tack-free state. In general the amount of peroxide used is kept as low as possible because of the difficulty of maintaining control over the decomposition thereof. In the case of benzoyl peroxide, the amount is preferably less than about 8 per cent by weight of the siloxane.

The paste composed of the organosiloxane, filler, and peroxide is then applied to the article to be coated by any suitable means such as by a knife blade, brush, or even by spraying if its consistency is sufficiently thin. The thickness of the coating I have found to be critical if a properly cured film is to be obtained without deliberately excluding oxygen. The coating should not be less than 0.1 mil thick nor more than 7.0 mils thick. The optimum range may be even more restricted depending upon the amount of peroxide, and filler present and also the time utilized to cure, but is readily determined by preliminary tests.

When a film or coating of the proper dimension has been applied to the base member, the resulting coated article is exposed to sufficient heat to raise the temperature of the coating to at least 180° C. within two minutes. Where exposure to heat is effected by placing the coated article in an oven it will obviously be necessary to have the oven at a temperature substantially higher than 180° C. if the coating is to reach 180° C. in two minutes. How much higher will depend, of course, on many factors, such as the size and shape of the article as well as the specific heat of the material of which it is made. The temperature of the coating should not, however, be allowed to reach 400° C. since the elastic properties of the resulting film are seriously impaired, particularly if the temperature is maintained at 400° C. for any appreciable length of time.

In the case of materials which cannot withstand high temperatures for any prolonged period of time, such as cotton or paper, I have found it advisable to subject them when coated with the organosilicon composition to a temperature much higher than 180° C. for a few seconds in order to effect curing. The higher temperature, i. e., 250° C. or better, does not harm the cellulosic material if maintained only momentarily and yet is sufficient to produce the desired curing of the organosilicon film.

For many applications it is desired to apply a film of the organosilicon composition described above which will not only possess the requisite dimensions but which will be uniform in thickness throughout. It is difficult to obtain such a uniform coating in commercial practice by utilizing a paste. Accordingly, a modification of the above procedure may be employed. Instead of a paste, a solution is made of the organo-polysiloxane and peroxide in a volatile solvent in which the proper amount of filler is suspended by thorough mixing. Articles to be coated may then be dipped in the suspension a sufficient number of times to deposit the desired coating or they may be sprayed with the liquid.

In curing the coatings obtained from use of solutions, it has been found necessary to substantially remove the solvent at a temperature below 50° C. before proceeding with the rapid high temperature treatment. The removal of the solvent may be accomplished by passing a stream of air thereover or by subjecting the coating to a vacuum. In general, any organic solvent having a boiling point equal to or less than that of toluene is suitable. Carbon tetrachloride is one which I have frequently used for the above purpose. Higher boiling solvents may be employed but so much time is required to remove them at temperatures below 50° C. that their use is not commercially feasible.

Once a solvent free coating is obtained, the procedure for curing it is the same as that described above in the case of a film applied from a paste. The solvent merely serves as a convenient vehicle for obtaining uniformity of film thickness and does not interfere with the effectiveness of cure obtained provided it is substantially removed before raising the temperature of the film to the desired high temperature.

The coated article should be held at the temperature of 180° or above until the coating has been completely cured. This is a matter of ten minutes at most, and frequently less than that. As the temperature is raised above 180° C. less time is required for complete curing as indicated above in the case of "flash" curing of coated cotton or paper.

For a better understanding of my invention, reference should be had to the following examples which are given by way of illustration and not limitation.

*Example 1*

100 parts by weight of liquid dimethyl silicone having a viscosity of 2600 centistokes, 100 parts of Titanox A (titanium dioxide) and 8 parts of benzoyl peroxide were mixed on a 3-roll paint mill. A paste was obtained which was a smooth, homogeneous, non-separating and very viscous material. This paste was brushed on to a cadmium copper panel to a thickness of approximately 2 mils thick. The coated panel was then placed in an oven and its temperature raised to 180° C. in 120 seconds and then held at about 200° C. for five minutes. The temperatures were determined by thermocouples in direct contact with the coating. By the end of the five minutes, a tack-free completely cured film was produced on the panel.

*Example 2*

100 parts of liquid dimethyl silicone having a viscosity of 2300 centistokes, 100 parts of Titanox A and 8 parts of benzoyl peroxide were milled on a 3-roll paint mill. Carbon tetrachloride was added with stirring until the solvent amounted to 80% by weight of the entire mixture. A panel of cadmium-plated copper was dipped in the resulting paint composition and air dried at room temperature. The thickness of the film was approximately 3 mils. The air dried panel was then heated in less than two minutes to 250° C. and held there 30 minutes without attempt being made to exclude oxygen. A smooth tack-free coat resulted which adhered tenaciously to the metal surface. Similar coatings were obtained when applied to ceramic and glass surfaces.

In general, I prefer to use as the organosilicon constituent of my coating composition those organosiloxanes whose organic substituents are lower alkyl radicals and which consist substantially entirely of dialkyl silicon oxide units of the formula $R_2SiO$ such as dimethyl silicone, diethyl silicone, up to diamyl silicone. These possess when cured by the peroxide treatment, a great resistance to repeated thermal shock both at high and low temperatures. This is particularly advantageous in applications where it is desired to protect electrical conductors from the effect of moisture when such conductors are being repeatedly and rapidly chilled or heated.

I claim:

1. The method which comprises applying a mixture of a toluene soluble organopolysiloxane in liquid state, an inorganic filler melting above 350° C. and a diacyl peroxide in amount less than 8 per cent by weight based upon the weight of the polysiloxane but in amount sufficient to promote curing of the siloxane to a tack-free state, the filler being present in such proportion as to form a paste, to a base member to form a coating thereon of between 0.1 and 7 mils thickness, raising the temperature of said coating to at least 180° C. but not above 400° C. within 2 minutes and maintaining the temperature within the range of 180° C. to 400° C. until the coating is cured, the organic substituents of said organopolysiloxane being monovalent hydrocarbon radicals attached to the silicon through carbon to silicon linkages, there being on the average between 1.75 and 2.25 of said radicals per silicon atom and there being present in the siloxane at least 60 mol per cent of the structural unit corresponding to the formula $R_2SiO$ where R is an alkyl radical, and said diacyl peroxide containing at least one aromatic acyl radical.

2. The method which comprises applying a mixture of a toluene soluble organopolysiloxane in liquid state, an inorganic filler melting above 350° C. and a diacyl peroxide in amount less than 8 per cent by weight based upon the weight of the polysiloxane but in amount sufficient to promote curing of the siloxane to a tack-free state, the filler being present in such proportion as to form a paste, to a base member to form a coating thereon of between 0.1 and 7 mils thickness, raising the temperature of said coating to at least 180° C. but not above 400° C. within 2 minutes and maintaining the temperature within the range of 180° C. to 400° C. until the coating is cured, the organic substituents of said organopolysiloxane being alkyl and phenyl radicals attached to the silicon through carbon to silicon linkages, there being on the average between 1.75 and 2.25 of said radicals per silicon atom and there being present in said siloxane at least 60 mol per cent of a structural unit corresponding to the formula $R_2SiO$ where R is an alkyl radical, and said diacyl peroxide containing at least one aromatic acyl radical.

3. The method which comprises applying a mixture of a toluene soluble dialkylpolysiloxane in liquid state, an inorganic filler melting above 350° C. and a diacyl peroxide in amount less than 8 per cent by weight based upon the weight of the polysiloxane but in amount sufficient to promote curing of the siloxane to a tack-free state, the filler being present in such proportion as to form a paste, to a base member to form a coating thereon between 0.1 and 7 mils thickness, raising the temperature of said coating to at least 180° C. but not above 400° C. within 2 minutes and maintaining the temperature within the range 180° C. to 400° C. until the coating is cured, the alkyl radicals of said polysiloxane having from 1 to 5 carbon atoms therein, and said diacyl peroxide containing at least one aromatic acyl radical.

4. The method which comprises applying a mixture of a toluene soluble dimethylpolysiloxane in liquid state, an inorganic filler melting above 350° C. and benzoyl peroxide in amount of less than 8 per cent by weight based upon the weight of the polysiloxane but in amount sufficient to promote curing of the siloxane to a tack-free state, the filler being present in such proportion as to form a paste, to a base member to form a coating thereon of between 0.1 and 7 mils thickness, raising the temperature of said coating to at least 180° C. but not above 400° C. within 2 minutes and maintaining the temperature within the range of 180° C. to 400° C. until the coating is cured.

5. The method in accordance with claim 4 wherein the filler is titanium dioxide.

6. The method of treating an article having a paste-like coating thereon comprising a toluene soluble dimethylpolysiloxane in liquid state, an inorganic filler melting above 350° C. and benzoyl peroxide in amount less than 8 per cent by weight based upon the weight of the polysiloxane but in amount sufficient to promote curing of the siloxane to a tack-free state, said coating being between 0.1 and 7 mils in thickness, which method comprises raising the temperature of the coating to at least 180° C. within 2 minutes and maintaining the temperature within the range of 180° C. to 400° C. until the coating is cured.

EARL LEATHEN WARRICK.

REFERENCES CITED

The following references are of record in the file of this patent:

UNITED STATES PATENTS

| Number | Name | Date |
| --- | --- | --- |
| 2,258,218 | Rochow | Oct. 7, 1941 |
| 2,392,713 | Wright | Jan. 8, 1946 |
| 2,448,565 | Wright et al. | Sept. 7, 1948 |

FOREIGN PATENTS

| Number | Country | Date |
| --- | --- | --- |
| 113,708 | Australia | Sept. 4, 1941 |